Dec. 28, 1926.  
C. W. FISHER  
1,612,761  
VALVE LOCKING DEVICE  
Filed Oct. 15, 1923

Inventor  
Charles W. Fisher  
By  
Attorneys

Patented Dec. 28, 1926.

1,612,761

UNITED STATES PATENT OFFICE.

CHARLES W. FISHER, OF SPRINGFIELD, OHIO, ASSIGNOR TO THE O. S. KELLY COMPANY, OF SPRINGFIELD, OHIO, A CORPORATION OF OHIO.

VALVE-LOCKING DEVICE.

Application filed October 15, 1923. Serial No. 668,465.

My invention relates to valve locking devices, it particularly relating to a device for locking valves of the screw type.

The object of the invention is to provide a simple and effective device for locking or holding a screw valve in different positions of adjustment.

Figure 1:
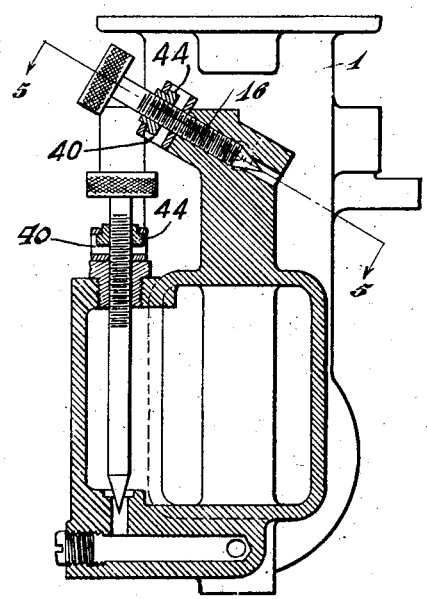
Fig. 1 is a vertical section of a carbureter showing my improved locking device associated with a pair of screw valves which form a part of the carbureter.
Figure 2:
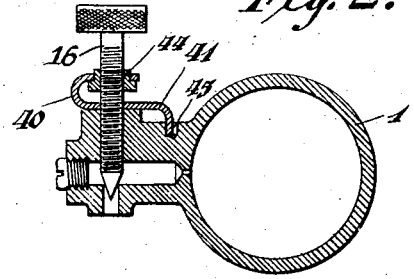
Fig. 2 is a section on the line 5—5 of Fig. 1.
Figure 3:
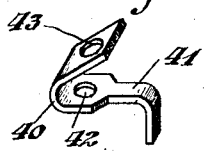
Fig. 3 is a perspective view of a portion of the locking device.

In the drawings, I have illustrated the use to which my improved locking device may be put by showing it associated with the screw valves of a carbureter 1. There is provided a plate stamped from spring sheet metal consisting of a main portion 40 and reduced portion 41. The main portion 40 is provided with a pair of orifices 42 and 43, the orifice 43 being provided with a bushing 44 having a threaded bore. The main portion 40 is bent upon itself to substantially the position shown in Fig. 3 so that the valve 16 may be threaded into the bushing and also extend through the orifice 42. The resiliency of the metal holds the threads of the bushing in frictional engagement with the threads of the valve so as to prevent the valve from turning. The down-turned end of the portion 41 is inserted in a recess 45 in the casing to prevent the lock from turning. To adjust the valve that portion of the spring plate which carries the bushing is pressed by the finger of the operator to bring the bushing in axial alignment with the valve after which the valve may be readily turned to or from its seat.

Having thus described my invention, I claim:

1. A locking device for a threaded valve stem consisting of a plate of spring metal provided with two apertures, one of which is threaded to receive the threads of said stem, said plate being capable of being sprung so as to bring said apertures into substantial alignment to receive said stem, the resiliency of the metal of the plate being adapted to cause the threads to bind and lock said stem from turning.

2. A locking device for a threaded valve stem consisting of a plate of spring metal provided with two apertures, said plate capable of being sprung so as to bring said apertures in substantial alignment to receive said threaded stem, a threaded bushing in one of said apertures in which said stem is adapted to be threaded the resiliency of the metal of the plate adapted to cause the threads to bind and lock said stem from turning, and means for holding said plate from turning.

3. A locking device for a threaded valve stem consisting of a plate of spring metal provided with two apertures, one of which is threaded to receive the threads of said stem, said apertures being normally out of alignment but being brought into alignment by springing said plate, the resiliency of the metal of the plate being adapted to cause the threads to bind and lock said stem from turning.

In testimony whereof, I have hereunto set my hand this 10th day of October, 1923.

CHARLES W. FISHER.